G. W. WATTS.
SPRING WHEEL.
APPLICATION FILED APR. 4, 1916.

1,256,403.

Patented Feb. 12, 1918.

WITNESSES:

INVENTOR
GEORGE W. WATTS,
BY
ATTORNEYS

UNITED STATES PATENT OFFICE.

GEORGE WILBER WATTS, OF HOT SPRINGS, ARKANSAS.

SPRING-WHEEL.

1,256,403.  Specification of Letters Patent.  Patented Feb. 12, 1918.

Application filed April 4, 1916.  Serial No. 88,897.

*To all whom it may concern:*

Be it known that I, GEORGE W. WATTS, a citizen of the United States, and a resident of Hot Springs, in the county of Garland and State of Arkansas, have invented a new and useful Improvement in Spring-Wheels, of which the following is a specification.

My invention is an improvement in spring wheels, and has for its object to provide a wheel especially adapted for use with trucks and like heavy motor vehicles but also adapted for use in any character of motor vehicle, wherein an auxiliary rim is provided arranged concentric to the wheel, and connected to the rim of the wheel by spring mechanism so arranged that shock or jar on the auxiliary rim will not be transmitted to the axle, but will be absorbed between the rim and the wheel.

In the drawings:—

In the present embodiment of the invention, the felly 1 of the wheel is provided with a quick demountable rim 2 of ordinary construction, and an auxiliary rim 3 is arranged concentric with the wheel, the said rim being of such size that there will be an annular space between the wheel and the auxiliary rim.

Figure 3:
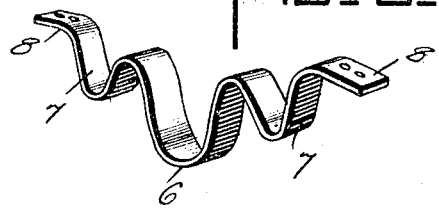
Fig. 3 is a perspective view of one of the springs.

The auxiliary rim is channeled on its periphery as indicated at 4 and a cushion tire 5 is mounted in the channel, the said tire being in the present instance of rubber. The auxiliary rim is connected to the demountable portion of the wheel rim by means of a series of springs, one of which is shown detached in Fig. 3.

Each of the springs is of plate material bent to form a body 6 and arms 7, and each arm is provided with a lateral outwardly extending lug 8 at its free end, the lugs being perforated as shown. The body of each spring fits against the outer face of the demountable portion of the quick demountable rim, and the body of each spring is connected to the said portion by means of a bolt 9, which is passed through the demountable portion of the rim and through the body of the spring and is engaged by a nut 10 on the outer face of the body.

Figure 1:
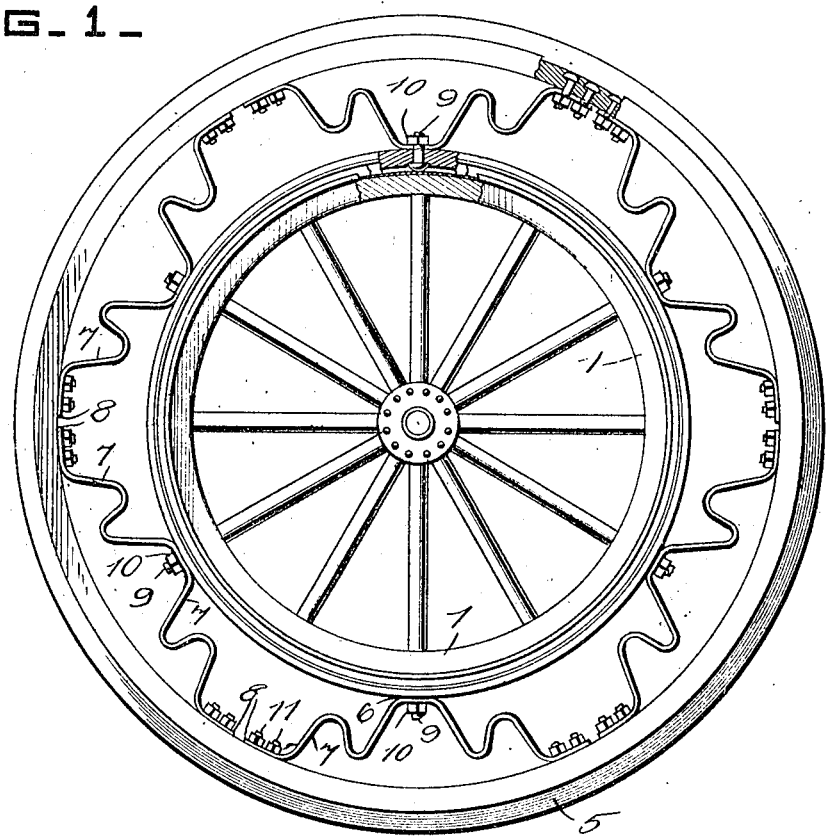
Figure 1 is a side view of the improved wheel with parts in section.

The lugs 8 of the arms 7 of each spring are lapped upon the inner surface of the rim at each side of the connection of the body, and each lug is connected to the auxiliary rim by a plurality of bolts and nuts 11. The heads of the bolts 11 as shown in Fig. 1, are countersunk in the bottom of the channel of the auxiliary rim so that the said heads are flush with the said bottom of the channel.

Figure 2:
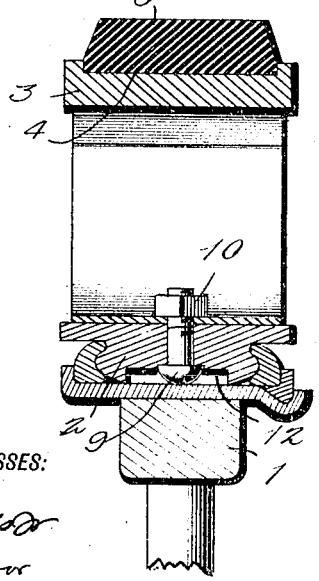
Fig. 2 is an enlarged section on the line 2—2 of Fig. 1.

The inner or concave face of the demountable portion of the quick demountable rim has an annular groove 12, and the heads of the bolts 9 are received in these grooves, being countersunk slightly as shown in Fig. 2, to cause the heads to be flush with the highest portion of the demountable portion of the rim.

Each arm 7 of each spring is bent back upon itself in zigzag or sinuous form as shown to provide for additional resiliency and in the present instance six of the springs 6—7—8 are provided, each having its body connected with the demountable rim and its arms with the auxiliary rim.

It will be evident that when shock or jar is imparted to the auxiliary rim at the lowest portion for instance, that spring 6—7 which is below will be compressed, the laterally bent portions moving toward each other and the body of the spring moving toward the auxiliary rim. That spring which is directly above will be expanded, the body moving away from the auxiliary rim. Those springs which are at the sides will be both compressed and expanded, the lower arm of each being compressed, while the upper arm will be expanded.

It will be understood that a greater or less number of springs may be used as may be desired, and the device is not limited to use with quick demountable rims, since it is obvious that the springs might be attached to the usual rims.

I claim:—

In combination with a wheel having a quick demountable rim, of an auxiliary rim arranged concentric with the wheel and in spaced relation, springs between the quick demountable rim and the auxiliary rim, each spring comprising a body connected with the wheel rim and arms diverging from the body in opposite directions and connected with the auxiliary rim, each arm being approximately Z-shaped, and all the component elements of each spring between its connections being inclined with respect to radii of the wheel.

GEORGE WILBER WATTS.

Copies of this patent may be obtained for five cents each, by addressing the "Commissioner of Patents, Washington, D. C."